(12) United States Patent
Veselovsky et al.

(10) Patent No.: US 7,779,703 B2
(45) Date of Patent: Aug. 24, 2010

(54) SYSTEM AND METHOD FOR ALIGNING A DEVICE RELATIVE TO A REFERENCE POINT OF A VEHICLE

(75) Inventors: Jeffrey S. Veselovsky, Mesa, AZ (US); Dean Van De Laare, Apache Junction, AZ (US)

(73) Assignee: The Boeing Company, Chicago, IL (US)

( * ) Notice: Subject to any disclaimer, the term of this patent is extended or adjusted under 35 U.S.C. 154(b) by 395 days.

(21) Appl. No.: 11/424,493

(22) Filed: Jun. 15, 2006

(65) Prior Publication Data
US 2007/0289393 A1 Dec. 20, 2007

(51) Int. Cl.
*G01D 7/00* (2006.01)
(52) U.S. Cl. .................................. 73/862.041
(58) Field of Classification Search ............ 73/862.041, 73/1.38, 862.046
See application file for complete search history.

(56) References Cited

U.S. PATENT DOCUMENTS

| | | | |
|---|---|---|---|
| 4,319,838 A * | 3/1982 | Grossman et al. ...... | 356/139.09 |
| 4,870,588 A * | 9/1989 | Merhav ..................... | 701/220 |
| 4,914,598 A * | 4/1990 | Krogmann et al. ............ | 701/11 |
| 5,245,909 A * | 9/1993 | Corrigan et al. ............ | 89/41.19 |
| 6,257,057 B1 * | 7/2001 | Hulsing, II ............... | 73/504.04 |
| 6,276,203 B1 * | 8/2001 | Hulsing, II ............... | 73/504.03 |
| 6,873,931 B1 * | 3/2005 | Nower et al. ................ | 702/151 |
| 7,337,650 B1 * | 3/2008 | Preston et al. ............... | 73/1.38 |
| 7,550,697 B2 * | 6/2009 | Veselovsky et al. .......... | 244/3.1 |

\* cited by examiner

*Primary Examiner*—Lisa M Caputo
*Assistant Examiner*—Octavia Davis (57) ABSTRACT

Methods, systems, and articles of manufacture consistent with the present invention provide for aligning a removable device relative to a vehicle using an angle sensor device and a computer system operatively connected to the angle sensor device. The angle sensor device has a first local axis and a second local axis orthogonal to the first local axis and a plurality of accelerometers. The first pair of the accelerometers is mounted along the first local axis, spaced apart a first predetermined distance, and oriented such that each of the first pair of accelerometers is operatively configured to sense a respective acceleration when the angle sensor device is rotated about the second local axis. The computer system is operatively configured to derive a first angular displacement based on the respective acceleration sensed by each of the first pair of accelerometers when the angle sensor device is rotated about the second local axis.

11 Claims, 8 Drawing Sheets

ND METHOD FOR ALIGNING A
SYSTEM AND METHOD FOR ALIGNING A DEVICE RELATIVE TO A REFERENCE POINT OF A VEHICLE

BACKGROUND OF THE INVENTION

The present invention relates to methods for boresighting, and, more particularly, to systems and methods for aligning a replaceable device (such as a radar, navigation system, missile, or other sensor or weapon) relative to a reference point or axis of a vehicle.

Boresighting is a technique for aligning a sensor device, missile, or other line replaceable unit (LRU) to an axis or point of a vehicle frame, such as an aircraft. Conventional boresighting systems include a line of sight (LOS) measurement system that requires an unobstructed path between an aircraft reference point and the LRU to be boresighted. Collimated light is used to determine the angle from the aircraft reference point to the LRU to be boresighted. Another conventional boresighting system includes a non-LOS measurement system that uses three ring-laser-gyros to measure the angular (i, j, k) difference between the aircraft reference point and the LRU being boresighted or measured. These conventional systems are both effective for boresighting an LRU to an aircraft frame; however, each of these conventional systems has specific limitations.

The conventional LOS measurement system requires a direct line of sight to the aircraft reference point and to each LRU to be boresighted. If an object obstructs the LOS of this measurement system then complex fixtures and adapters are typically required to make a measurement. These fixtures and adapters inherently induce error, expense, and operator training. The conventional non-LOS measurement system includes expensive components, requiring a significant economic investment to acquire this measurement system.

Therefore, a need exists for systems and methods that overcome the problems noted above and others previously experienced for aligning a device to a vehicle frame.

SUMMARY OF THE INVENTION

In accordance with systems consistent with the present invention, an alignment system is provided. The alignment system comprises an angle sensor device having a first local axis, a second local axis orthogonal to the first local axis, a third local axis orthogonal to the first local axis and the second local axis, and a plurality of accelerometers. A first pair of the accelerometers is mounted along the first local axis, spaced apart a first predetermined distance, and oriented such that each of the first pair of accelerometers is operatively configured to sense a respective acceleration when the angle sensor device is rotated about the second local axis. The alignment system further comprises a computer system operatively connected to the angle sensor device and operatively configured to derive a first angular displacement based on the respective acceleration sensed by each of the first pair of accelerometers when the angle sensor device is rotated about the second local axis.

In accordance with articles of manufacture consistent with the present invention, an angle sensor for determining a misalignment error of a device adapted to be removable mounted to a vehicle is provided. The angle sensor device comprises a local body coordinate system having a first local axis, a second local axis orthogonal to the first local axis, a third local axis orthogonal to the first local axis and the second local axis. The angle sensor device further comprises a plurality of accelerometers. A first pair of the accelerometers is mounted along the first local axis, spaced apart a first predetermined distance, and oriented such that each of the first pair of accelerometers is operatively configured to sense a respective acceleration when the angle sensor device is rotated about the second local axis.

Other systems, methods, features, and advantages of the present invention will be or will become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE DRAWINGS

The accompanying drawings, which are incorporated in and constitute a part of this specification, illustrate an implementation of the present invention and, together with the description, serve to explain the advantages and principles of the invention. In the drawings.

DETAILED DESCRIPTION OF THE INVENTION

Reference will now be made in detail to an implementation in accordance with methods, systems, and products consistent with the present invention as illustrated in the accompanying drawings.

Methods, systems, and articles of manufacture consistent with the present invention determine an angular displacement or alignment of a removable device, such as a sensor device, relative to a reference point or axis of a vehicle frame, allowing the vehicle to subsequently correct for the angular displacement in a measurement received from the removable device (e.g., vehicle pitch as sensed by a removable navigation device) or in a guidance parameter sent to the removable device (e.g., line of sight of a target sent to a guidance system of a removable missile device) when the vehicle is moving.

Figure 1:
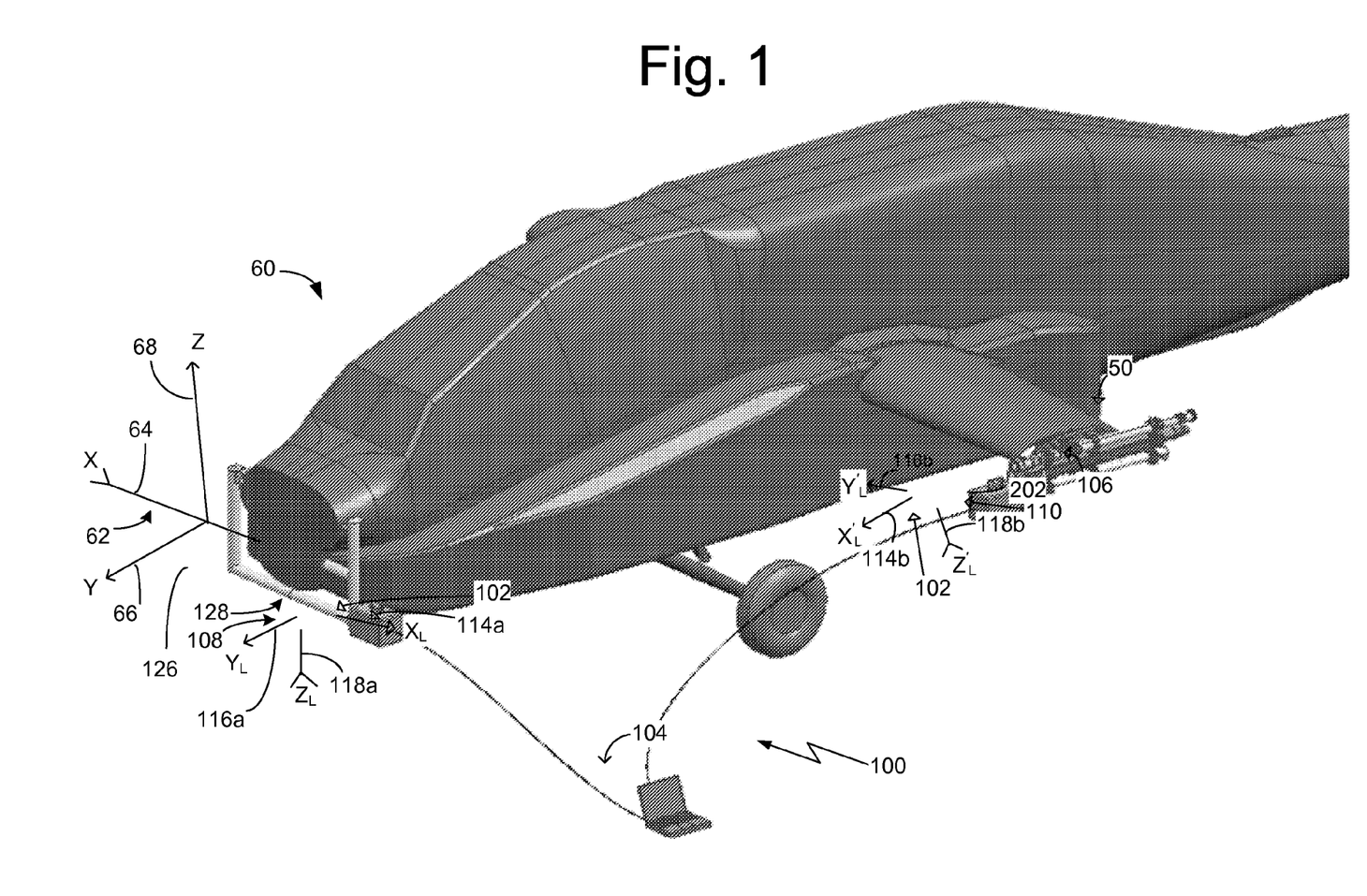
FIG. 1 depicts a diagram of an exemplary alignment system for aligning a removable device relative to a reference point or axis of a vehicle consistent with the present invention.
Figure 2:
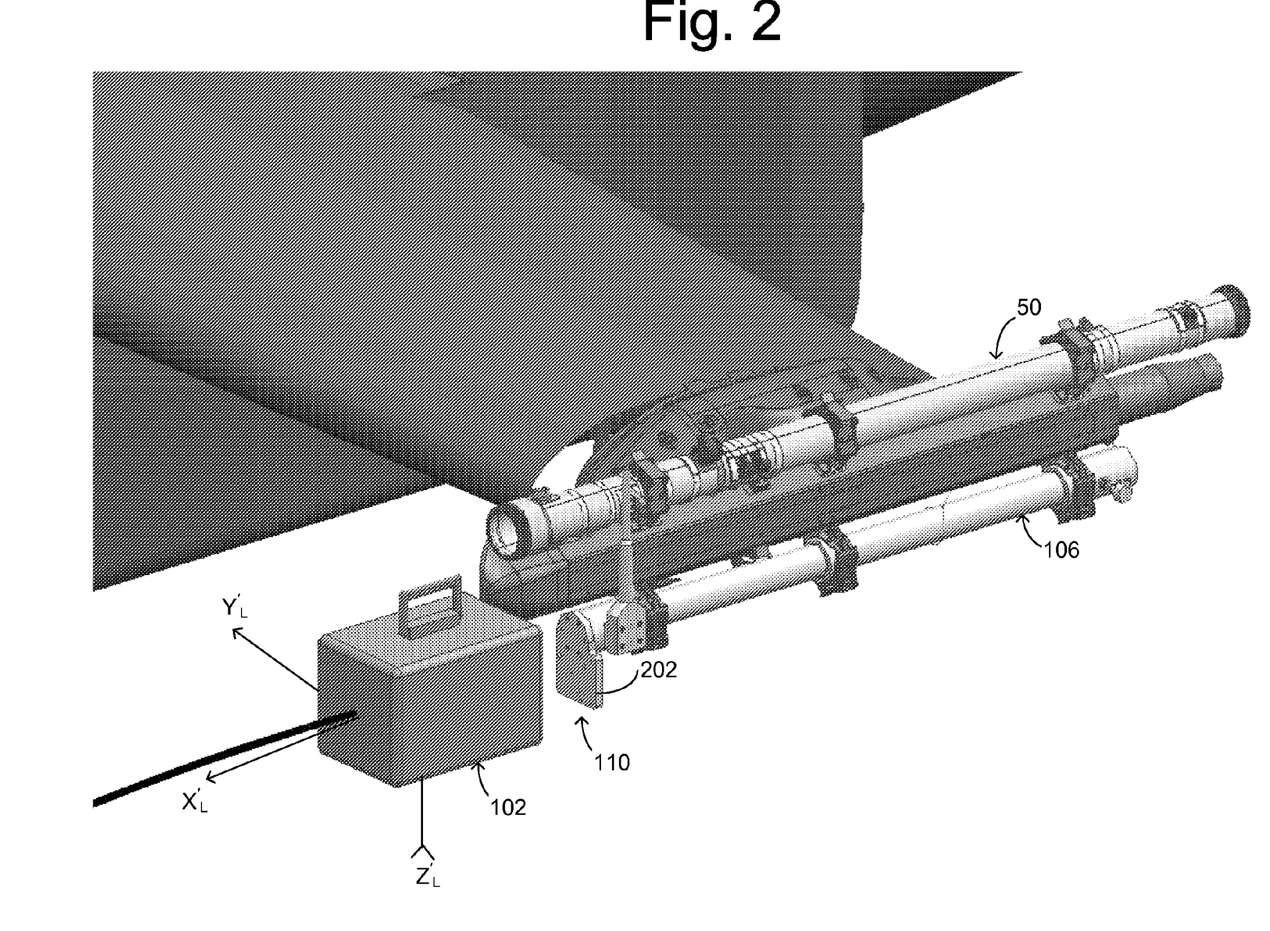
FIG. 2 is a magnified view of an angle sensor device of the alignment system in FIG. 1.

FIG. 1 depicts a diagram of an alignment system 100 for boresighting or aligning one or more removable devices (e.g., removable device 50) relative to a reference point or axis of a vehicle 60 (e.g., x axis 64 of the vehicle's body axis coordinate system 62) in accordance with the present invention. The system 100 includes an angle sensor device 102, a computer system 104 operatively connected to the angle sensor device 102, and an alignment fixture 106 operatively configured to be removably mounted to the vehicle 60 in place of or in conjunction with one of the removable devices 50 to be aligned in accordance with the present invention. FIG. 2 provides a magnified view of a portion of the alignment system 100 and the vehicle 60 in FIG. 1, where the one removable device 50 to be aligned has been replaced by the alignment fixture 106 and the angle sensor device 102 is disposed relative to the alignment fixture 106.

Figure 3:
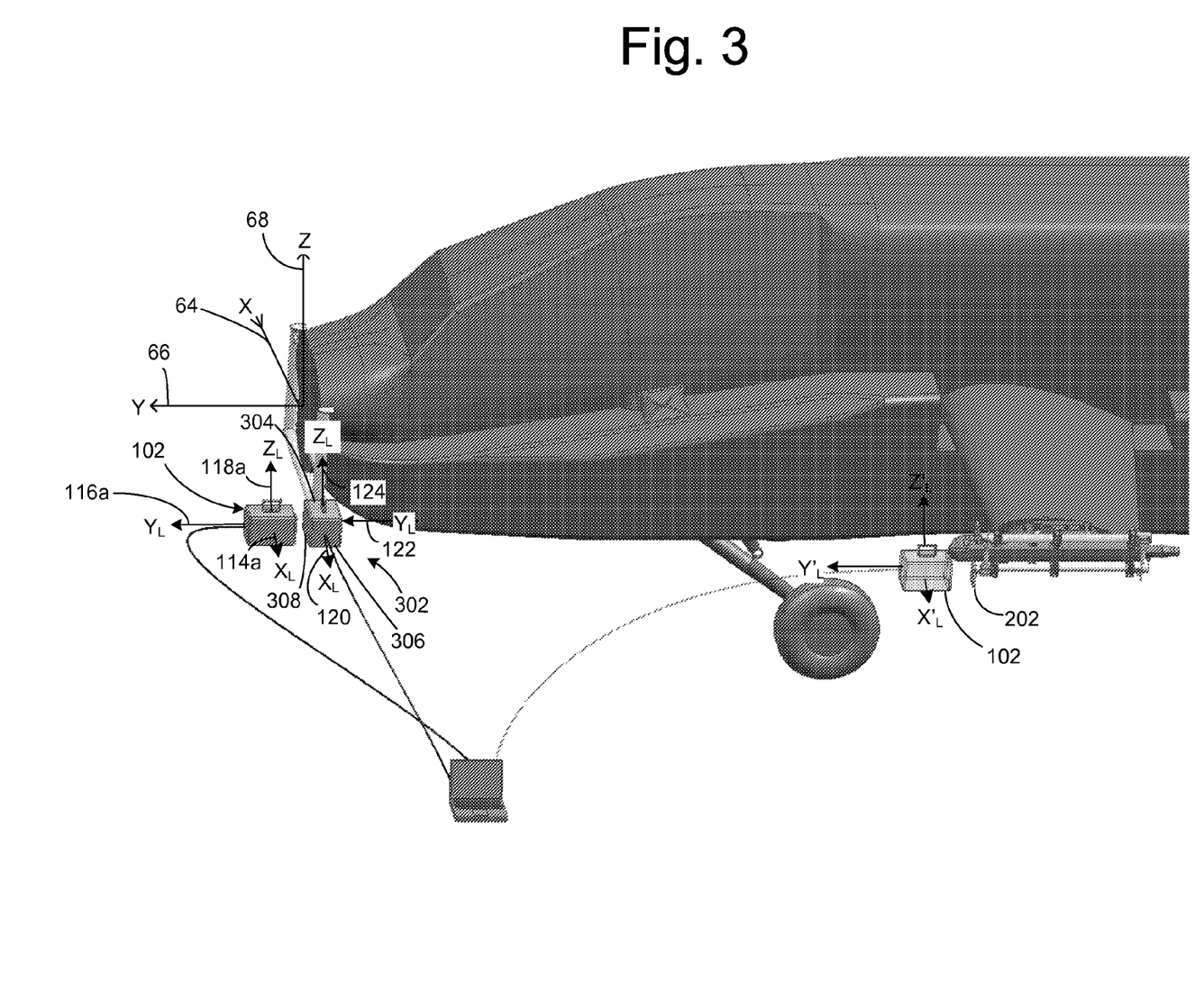
FIG. 3 depicts a diagram of another exemplary alignment system for aligning a removable device relative to a reference point or axis of a vehicle consistent with the present invention, in which the system has a reference sensor device and the angle sensor device.
Figure 4:
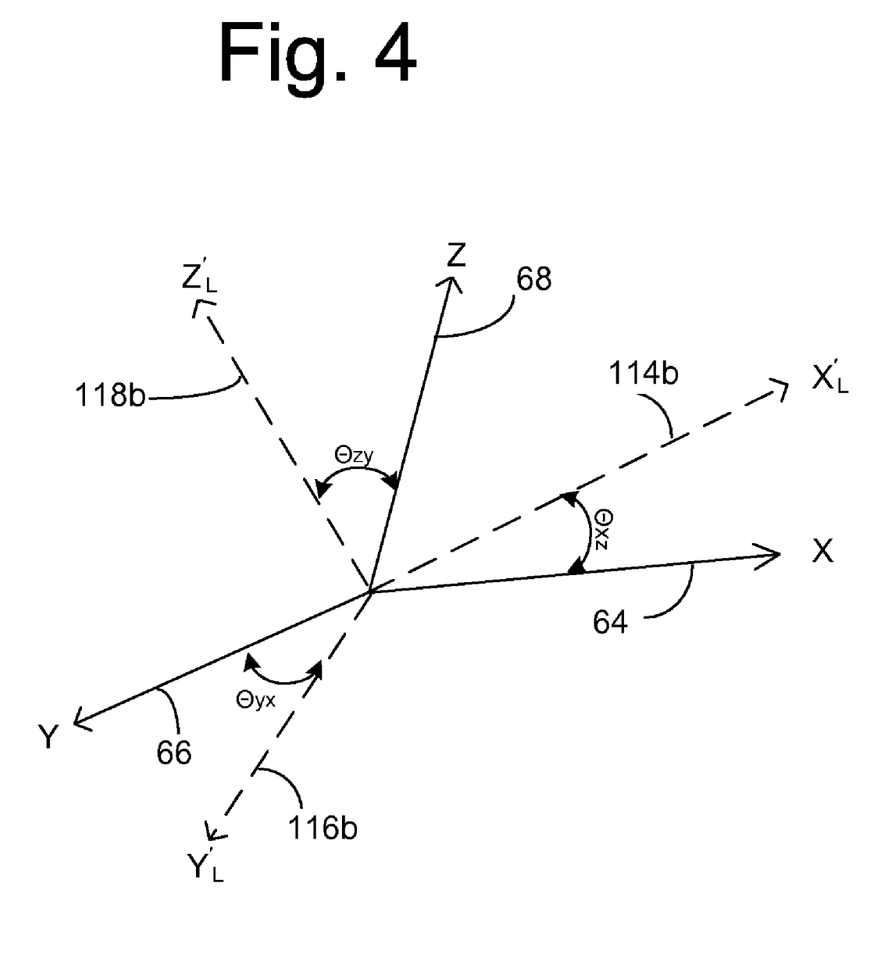
FIG. 4 depicts the body axes of the vehicle relative to the local axes of the removable device, reflecting an exemplary angular misalignment error (e.g., a roll angle θxz error, a heading angle θyx error, and/or a pitch angle θzy error), which may be measured by the alignment system in accordance with the present invention.

In one implementation, the angle sensor device 102 is initially disposed relative to or mounted at a reference location 108 of the vehicle 60 and then moved to a second location 110 where the alignment fixture 106 is located so that the alignment system 100 may derive one or more angular corrections (e.g., a roll angle θxz error, a heading angle θyx error, and/or a pitch angle θzy error of the removable device 50 relative to the vehicle 60 axes 64, 66, and/or 68 as shown in FIG. 4) for the removable device 50 to be installed at the second location 110 as described in further detail below. In another implementation shown in FIG. 3, the system includes a second or reference sensor device 302 that functionally corresponds to the first sensor device 102 and is operatively connected to the computer system 104. In this implementation, the reference angle sensor device 302 and the angle sensor device 102 are each initially disposed relative to or mounted at the reference location 108 of the vehicle 60. For example, the angle sensor device 102 may be removably mounted on a top 304, a bottom 306, or a side 308 of the reference sensor device 302 such that the body axes of each sensor device 102 and 302 are initially aligned as further discussed herein. While the reference angle sensor device 302 remains disposed relative to the reference location 108, the other angle sensor device 102 is then moved to a second location 110 where the alignment fixture 106 is located so that the alignment system 100 may derive one or more angular corrections for the removable device 50 to be installed at the second location 110.

In the implementation shown in FIGS. 1-3, the vehicle 60 corresponds to a helicopter and the removable device 50 corresponds to a missile having a guidance system. However, the vehicle 60 may be an airplane, a ground based vehicle (such as an automobile or tank), a water based vehicle (such as a ship or submarine), or other platform having one or more removable sensor devices (e.g., a navigation unit, radar unit, or other sensor) or one or more removable weapon devices (e.g., such as a missile or gun barrel) that require alignment relative to a point or axis of the platform.

As shown in FIGS. 1 and 3, the vehicle 60 has a body axis coordinate system 62 that includes a x-axis 64, a y-axis 66 orthogonal to the x-axis 64, and a z-axis 68 orthogonal to both the x-axis 64 and the y-axis 66. In the implementation depicted in FIGS. 1 and 3, the y-axis 66 is disposed along the longitudinal body axis of the vehicle 60, the x-axis is disposed along a lateral body axis of the vehicle 60, and the z-axis is disposed along a vertical axis of the vehicle 60. However, the x-axis 62, the y-axis 64, and the z-axis 66 may be oriented relative to other axes of the vehicle 60.

The angle sensor 102 has a local x-axis ($x_L$) 114a, a local y-axis ($y_L$) 116a, and a local z-axis ($z_L$) 118a. In the implementation shown in FIG. 3, the reference sensor 302 has a local x-axis ($x_L$) 120, a local y-axis ($y_L$) 122, and a local z-axis ($z_L$) 124 consistent with the local axes 114a, 116a, and 118a of the angle sensor 102. When the angle sensor 102 is disposed at the reference location 302 of the vehicle 60 in accordance with the present invention, each local axis 114a, 116a, and 118a of the angle sensor 102 is substantially aligned with a respective axis 64, 66, or 68 of the vehicle 60. Similarly, in the implementation shown in FIG. 3, when the reference sensor 302 is disposed at the reference location 108 of the vehicle 60, each local axis 120, 122, and 124 of the reference sensor 102 is substantially aligned with the same respective axis 64, 66, or 68 of the vehicle 60. Note, although the angle sensor device 102 is shown oriented 90 degrees out of alignment in the with the x-axis 64 and y-axis 66 of the vehicle 60 when mounted at the reference location 108 in FIG. 1, the computer system 104 is operatively configured to adjust for this initial misalignment.

In the implementation depicted in FIG. 1, the system 100 includes a vehicle frame adapter 126 that is adapted to be removably engaged to the vehicle 60 such that each local axis 114a, 116a, and 118a of the angle sensor 102 is substantially aligned with a respective axis 64, 66, or 68 of the vehicle 60 when the angle sensor 102 is mounted to one end 128 of the vehicle frame adapter 126. The one end 128 of the vehicle frame adapter 126 may include a platform (obscured by the sensor 102 in FIG. 1) for receiving and removably engaging the angle sensor 102. In the implementation depicted in FIG. 3, the reference sensor device 302 may alternatively be mounted to the one end 128 of the vehicle frame adapter 126 and the angle sensor device 102 be removably mounted on the top 304, the bottom 306, or the side 308 of the reference sensor 302 such that the local axes 114a, 116a, 118a and 120, 124, 126 of each sensor 102 and 302 are each aligned with the respective axes 64, 66, and 68 of the vehicle 60.

As shown in FIGS. 1-3, the alignment fixture 106 may include a surface 202 for receiving and removably engaging the angle sensor device 102 such that the local x-axis ($x_L$) 114a, the local y-axis ($y_L$) 116a, and the local z-axis ($z_L$) 118a of the angle sensor device 102 are each aligned with a corresponding local axis (e.g., local x-axis ($X'_L$) 114b, local y-axis ($Y'_L$) 116b, and the local z-axis ($Z'_L$) 118b) of the removable device 50 as if the removable device were installed at the second location 110 of the vehicle 60.

As further described herein, when the removable device 50 is disposed at or installed at the second location 110 (e.g., weapon station or sensor device platform) relative to the vehicle 60, the local axes of the removable device 50 may be misaligned relative to the body axes 64, 66, and 68 of the vehicle 60 such that there is a roll. For example, FIG. 4 depicts the body axes 64, 66, and 68 of the vehicle 60 relative to the corresponding local axes 114b, 116b, and 118b of the removable device 50 or the angle sensor device 102 when either is installed at the second location 110 relative to the vehicle 60. In the example shown in FIG. 4, when installed at the second location 110, the removable device 50 or the angle sensor device 102 has an exemplary angular misalignment error (e.g., a roll angle θxz error, a heading angle θyx error, and/or a pitch angle θzy error), which may be derived by the alignment system 100 in accordance with the present invention.

Figure 5:
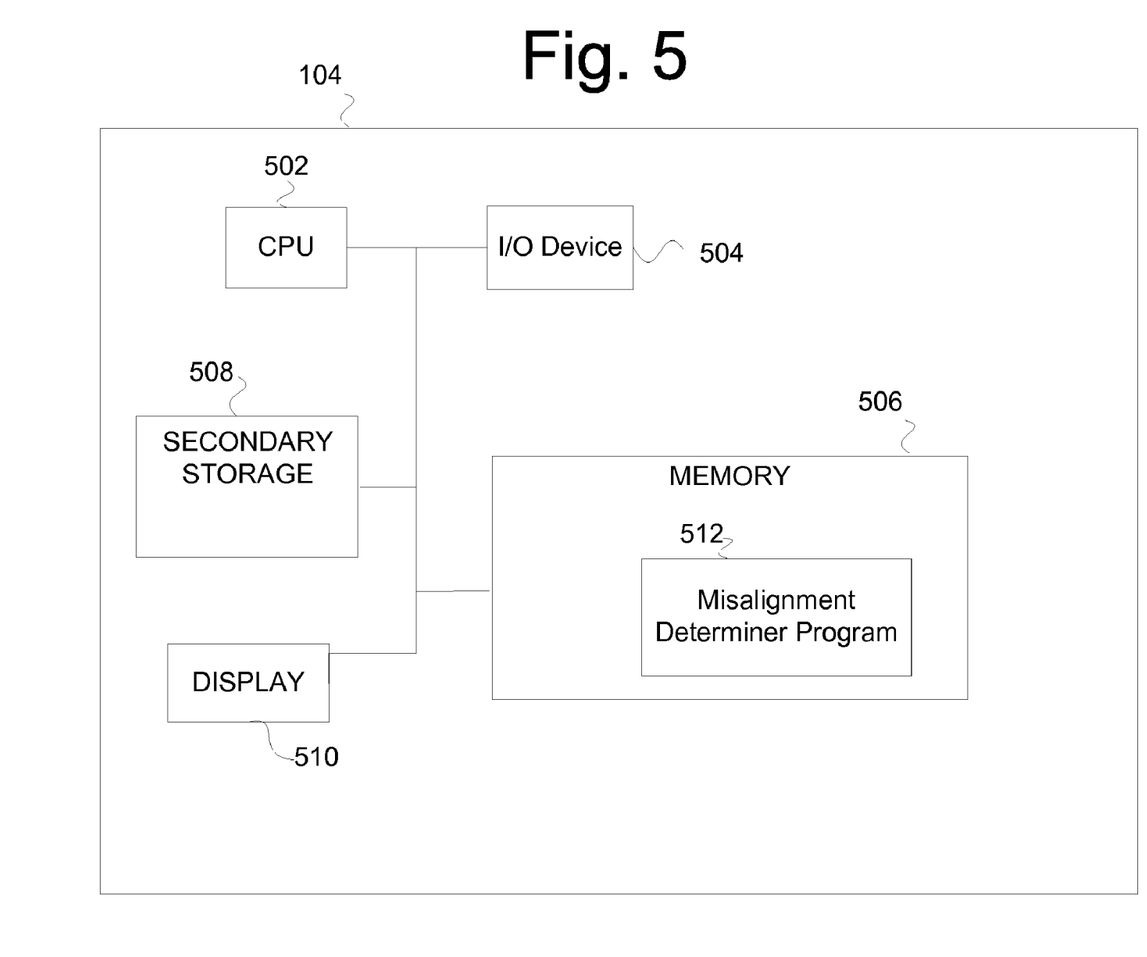
FIG. 5 is block diagram of an exemplary computer system of the alignment system in FIG. 1 and FIG. 3 in accordance with the present invention.

FIG. 5 depicts a block diagram of an exemplary computer system 104 suitable for use with methods and systems consistent with the present invention. The computer system 104 comprises a central processing unit (CPU) 502, an input output (I/O) device 504 operatively configured to communicate with the angle sensor device 102 and/or the reference sensor device 302, a memory 506, a secondary storage device 508, and a display 510. The computer system 104 may further comprise standard input devices such as a keyboard, a mouse or a speech processing means (each not illustrated). Memory 506 includes a misalignment determiner program 512 for deriving a roll angle θxz error, a heading angle θyx error, and/or a pitch angle θzy error for a removable device 50 based on as discussed in further detail below.

Figure 6:
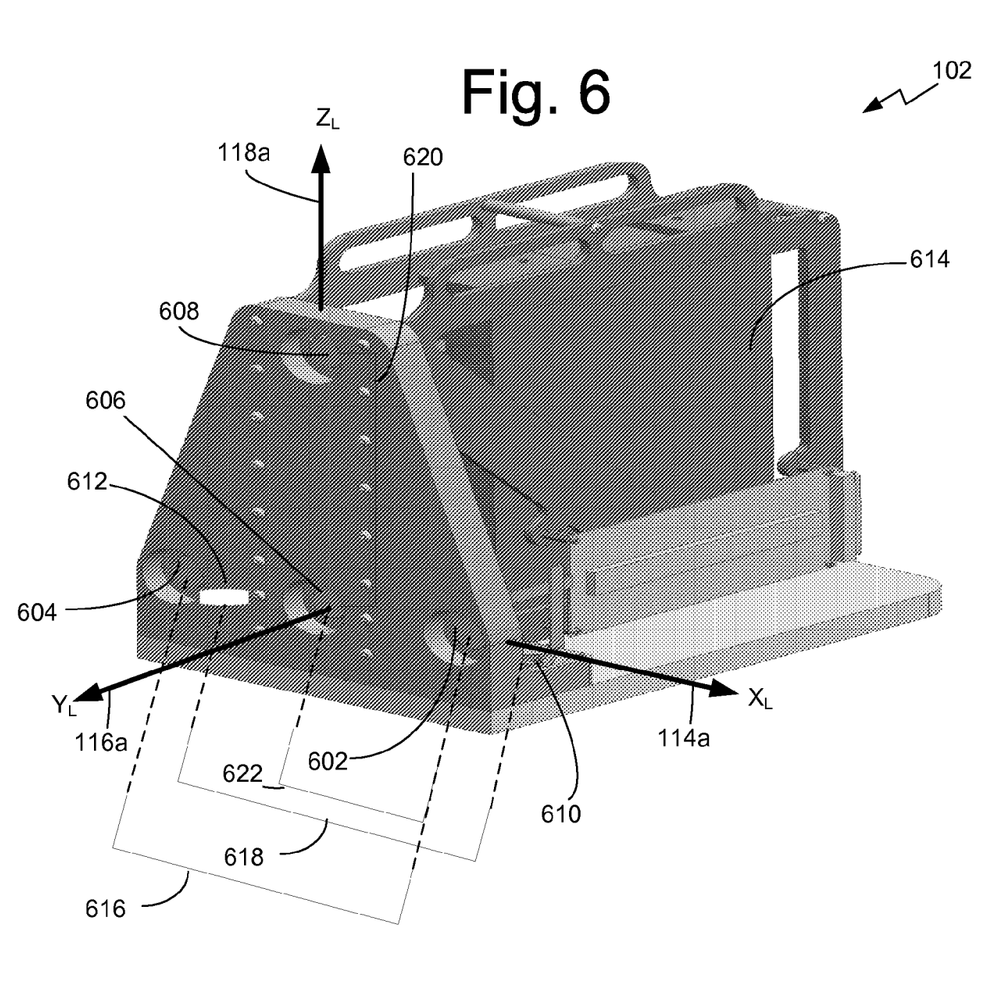
FIG. 6 is perspective view of the angle sensor device, illustrating a plurality of accelerometers mounted on the angle sensor device such that each respective pair of the accelerometers senses a pair of accelerations used by the computer system to derive an angular displacement about a respective local axis of the angle sensor device relative to a corresponding axis of the vehicle in accordance with the present invention.

FIG. 6 is an exemplary perspective internal view (e.g., with outer housing as shown in FIGS. 1-3 removed) of the angle sensor device 102. The angle sensor device 102 includes a plurality of accelerometers 602, 604, 606, 608, 610, and 612 and an A/D converter 614 operatively connected to each of the accelerometers 602, 604, 606, 608, 610, and 612. The A/D converter 614 is adapted to convert each acceleration sensed by each accelerometer 602, 604, 606, 608, 610, and 612 from an analog signal to a digital value and separately output the digital value of each sensed acceleration to the computer system 104 for processing by the misalignment determiner 512 as further discussed below. Each accelerometer 602, 604, 606, 608, 610, and 612 may be a known commercially available accelerometer such as used in automotive or video game controller applications. Alternatively, each accelerometer 502, 504, 506, 508, 610, and 612 may be a known navigation quality accelerometer for use in aircraft, such as one of the Q-Flex QA2000 series of accelerometers commercially available from Honeywell International, Inc.

As shown in FIG. 6, a first pair 602, 604 of the plurality of accelerometers are mounted along the local x-axis 114a (or first local axis), spaced a predetermined distance 616 apart along the local x-axis 114a, and oriented such that each of the first pair 602, 604 of accelerometers is operatively configured to sense a respective acceleration when the angle sensor device 102 is rotated about the local z-axis 118a (or second local axis orthogonal to the first local axis). As further explained below, the misalignment determiner 512 of the computer system 104 is operatively configured to derive an angle displacement θi (e.g., a heading error) based on the two accelerations sensed by the first pair 602, 604 of accelerometers and the predetermined distance 616 between the two accelerometers 602, 604. A second pair 606, 608 of the plurality of accelerometers 602, 604, 606, 608, 610, and 612 is mounted along the local z-axis 118a (i.e., the second local axis), spaced a predetermined distance 620 apart along the local z-axis 118a, and oriented such that each of the second pair 606, 608 of accelerometers is operatively configured to sense a respective acceleration when the angle sensor device 102 is rotated about the local x-axis 114a (i.e., the first local axis). The misalignment determiner 512 is operatively configured to derive an angle displacement θj (e.g., a pitch error) based on the two accelerations sensed by the second pair 606, 608 of accelerometers and the predetermined distance 618 between the two accelerometers 606, 608. A third pair 610, 612 of the plurality of accelerometers 602, 604, 606, 608, 610, and 612 is mounted along the local x-axis 114a (i.e., the first local axis), spaced a predetermined distance 618 apart along the local x-axis 114a, and oriented such that each of the third pair 606, 608 of accelerometers is operatively configured to sense a respective acceleration when the angle sensor device 102 is rotated about the local y-axis 116a (i.e., a third local axis orthogonal to each of the first and second axes). The misalignment determiner 512 is operatively configured to derive an angle displacement θk (e.g., a roll error) based on the two accelerations sensed by the third pair 610, 612 of accelerometers and the predetermined distance 618 between the two accelerometers 610, 612.

In another implementation, the accelerometer 606 may be used as a common accelerometer along the local x-axis 114a and one of the two accelerometers 602 and 604 need not be employed or used. In this implementation, the first pair of accelerometers may comprise the common accelerometer 606 and one of the accelerometers 602 or 604 mounted along the local x-axis 114a (or first local axis), spaced a predetermined distance 622 apart along the local x-axis 114a, and oriented such that each of the first pair of accelerometers (e.g., common accelerometer 606 and one of accelerometers 602 or 604) is operatively configured to sense a respective acceleration when the angle sensor device 102 is rotated about the local z-axis 118a (or second local axis orthogonal to the first local axis). In this implementation, the misalignment determiner 512 of the computer system 104 is operatively configured to derive the angle displacement θi (e.g., a heading error) based on the two accelerations sensed by the first pair of accelerometers (606 and either 602 or 604) and the predetermined distance 620 between the two first pair accelerometers (606 and either 602 or 604). Accordingly, in this implementation the first pair of accelerometers mounted on the first local axis (local x-axis 114a) share a common accelerometer 606 with the second pair 606, 608 of accelerometers mounted along the second local axis (local z-axis 118a) as discussed herein.

In accordance with systems and methods consistent with the present invention, as the angle sensor device 102 is moved from the reference location 108 to the second location 110 (where the removable device 50 may be mounted), the angle sensor device 102 is operatively configured to simultaneously sense a pair of accelerations from each pair of accelerometers 602, 604, 606, 608, 610, and 612 mounted on a respective local axis 114a, 116a, and 118a when the angle sensor device 102 is rotated about a corresponding orthogonal local axis 114a, 116a, and 118a. The angle sensor device 102 is also operatively configured to provide each sensed pair of accelerations to the misalignment determiner 512 of the computer system 104. In response, the misalignment determiner 512 derives an angular displacements (e.g., θi, θj, and/or θk) for each sensed pair of accelerations and determines the corresponding misalignment errors (e.g., a roll angle θxz error, a heading angle θyx error, and/or a pitch angle θzy error) for the removable device 50 based on the derived angular displacements (e.g., θi, θj, and/or θk). When the angle sensor device 102 is mounted to the second location 110 where the removable device 50 normally resides and no further pairs of accelerations are received by the misalignment determiner 512, the misalignment determiner 512 stores the corresponding misalignment errors (e.g., a roll angle θxz error, a heading angle θyx error, and/or a pitch angle θzy error) for the removable device 50 so that the misalignment errors may be compensated for during operation of the removable device 50 on the vehicle 60.

Figure 7:
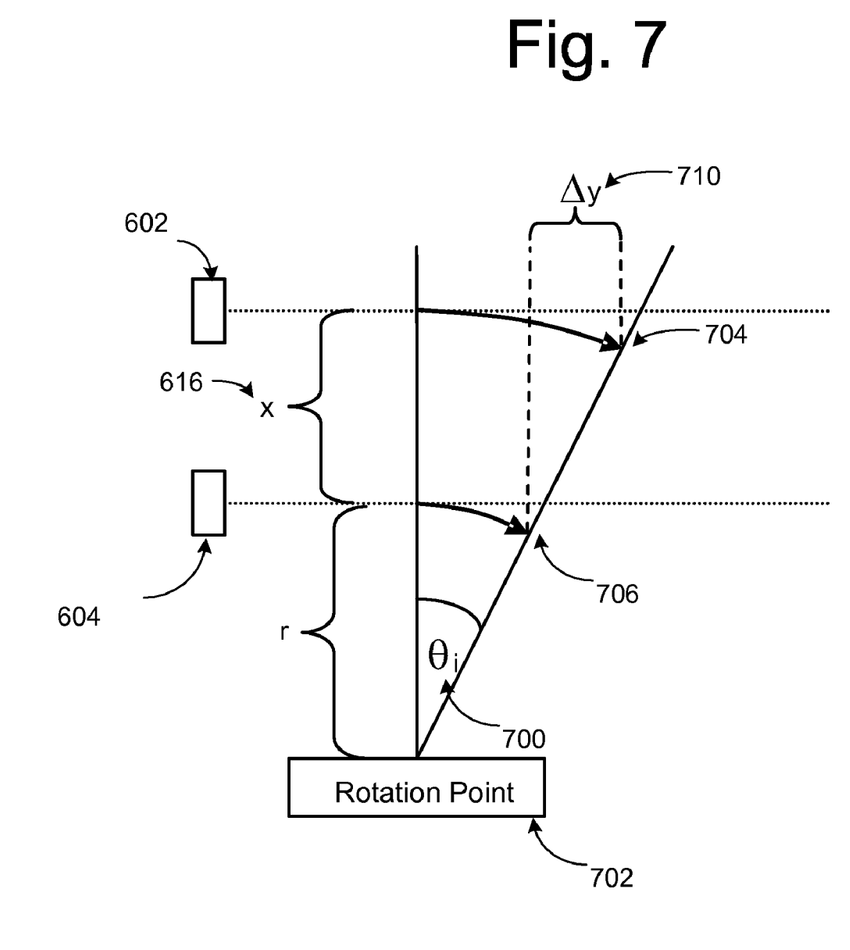
FIG. 7 illustrates a technique employed by the computer system to derive an angular displacement based on a pair of accelerations sensed by a pair of accelerometers of the angle sensor device in accordance with the present invention.

FIG. 7 illustrates a technique employed by the misalignment determiner 512 of the computer system 104 to derive an angular displacement 700 (e.g., θi, θj, or θk) based on a pair of accelerations sensed by a pair of accelerometers (e.g., 602, 604; 606, 608; or 610, 612) of the angle sensor device 102 in accordance with the present invention. In the implementation in FIG. 7, when moving the angle sensor device 102 from the reference location 108 to the second location 110 where the removable device 50 normally resides in or on the vehicle 60, the pair of accelerometers 602, 604 are rotated about a point 702 in space that causes a corresponding rotation about the local z-axis 118a orthogonal to the local x-axis 114a on which the pair of accelerometers 602, 604 are mounted. In response, the pair of accelerometers 602 and 604 sense two different accelerations 704 and 706, respectively, corresponding to the predetermined distance 616 (also referenced as "x" in FIG. 7) between the pair of accelerometers 602 and 604. The two different accelerations 704 and 706 are provided by the angle sensor device 102 to the computer system 104, where the misalignment determiner 512 subtracts the two accelerations 704 and 706 to produce a corresponding distance displacement 710 (also referenced as "Δy" in FIG. 7) in the local y-axis 116a (i.e., the axis orthogonal to the axis of rotation and planar to the axis in which the two accelerometers 602 and 604 are disposed). The misalignment determiner 512 is able to derive the displacement angle θi in accordance with Equation (1).

$$\Delta y / x = \theta i \text{ radians} \quad \text{Equation (1)}$$

Figure 8:
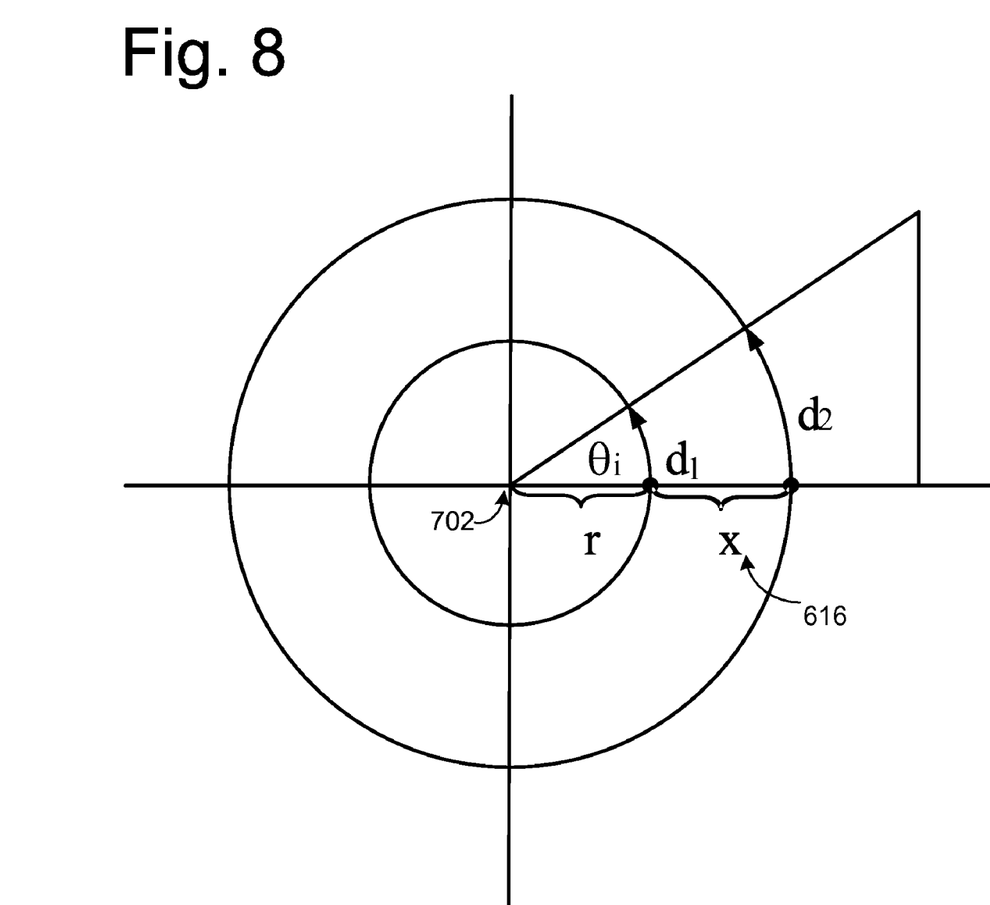
FIG. 8 depicts a graphical representation of the technique shown in FIG. 7 to derive an angular displacement based on a pair of accelerations sensed by a pair of accelerometers of the angle sensor device in accordance with the present invention.

FIG. 8 depicts a graphical representation of the technique shown in FIG. 7 to derive an angular displacement θi based on the pair of accelerations 704 and 706 sensed by the pair of accelerometers 602, 604 of the angle sensor device 102 in accordance with the present invention. As shown in FIG. 8 and expressed in Equation (2), the angular displacement θi may be derived from the distance displacement ($d_1$) corresponding to the acceleration 704 sensed by the first 604 of the pair of the accelerometers 602, 604 in FIG. 7 and the radius (r) that extends from the rotation point 700 to the first of the accelerometers 602, 604.

$$\theta i = d_1 / r \quad \text{Equation (2)}$$

In accordance with Equation (2), the distance displacement ($d_1$) corresponding to the acceleration 704 sensed by the accelerometer 602 in FIG. 7 may be determined from the angular displacement θi and the radius (r) as shown in Equation (3)

$$d_1 = \theta r \quad \text{Equation (3)}$$

As reflected by Equation (4), the angular displacement θi may also be derived from the distance displacement ($d_2$) corresponding to the acceleration 706 sensed by the second 602 of the pair of the accelerometers 602, 604 in FIG. 7 and the distance from the rotation point 700 to the first of the accelerometers 602, 604 (i.e., the distance corresponding to "r" plus "x" shown in FIG. 8).

$$d_2 = \theta (r + x) \quad \text{Equation (4)}$$

Thus, using the relationships identified in Equations (3) and (4) the delta distance displacement 710 or "Δy," Equation (1) may be written as shown in Equation (5).

$$(d_2 - d_1) / x = \theta \quad \text{Equation (5)}$$

As would be understood by one skilled in the art, the technique for deriving the angular displacement θi as expressed in Equations (1) and (5) based on a pair of accelerations 704 and 706 sensed by the pair of accelerometers 602, 604 may also be used to derive the angular displacement θj based on a pair of accelerations 704 and 706 sensed by the pair of accelerometers 606, 608 when rotated about the point 702 that causes a corresponding rotation about the local x-axis 114a orthogonal to the local z-axis 118a on which the pair of accelerometers 606, 608 are mounted. Similarly, the same technique for deriving the angular displacement θi as expressed in Equation (1) and (5) may also be used to derive the angular displacement θk based on a pair of accelerations 704 and 706 sensed by the pair of accelerometers 610, 612 when rotated about the point 702 that causes a corresponding rotation about the local y-axis 116a orthogonal to the local x-axis 114a on which the pair of accelerometers 610, 612 are mounted. As further explained below, the misalignment determiner 512 is operatively configured to derive angular misalignment errors (e.g., a roll angle θxz error, a heading angle θyx error, and a pitch angle θzy error) between the reference location 108 and the second location 110 of the removable device 50 based on the derived angular displacements θi, θj, and θk.

To derive the angular misalignment errors (e.g., a roll angle θxz error, a heading angle θyx error, and a pitch angle θzy error) for a removable device 50 relative to a reference point or axis of the vehicle 60 (e.g., the x-axis 64, y-axis 66, and/or z-axis 68 of the vehicle's body axis coordinate system 62), may require iteratively deriving each of the angular displacements θi, θj, and θk as the angle sensor device 102 is moved from the reference location 108 to the second location 110 where the removable device 50 is to be mounted. In addition, since the angle sensor may be rotated about a point 702 in space rather than a single plane or local axis of the angle sensor device 102, the misalignment determiner 512 is operatively configured to derive the heading angle θyx error, the pitch angle θzy error, and the roll angle θxz error based on corresponding components of the derived angular displacements θi, θj, and θk of the angle sensor device 102 as further explained below. The faster that the accelerometers 602, 604, 606, 608, 610, and 612 can sense a respective acceleration (i.e., the smaller the respective rotation associated with each sensed acceleration) and the faster that the angular displacements θi, θj, and θk can be derived by the misalignment determiner 512, the more accurate the final angular misalignment errors will be. Accordingly, the alignment system 100 is adapted to derive and process angular displacements θi, θj, and θk at a rate of 100 Hz or faster.

In general, the alignment system 100 allows a series of rotations in all three local axes 114a, 116a, and 118a of the angle sensor device 102 to take place in any order and when the second location 110 is reached a final composite value of each of the heading angle θyx error, the pitch angle θzy error, and the roll angle θxz error is determined and stored as the angle misalignment errors for the removable device 50. In one implementation, to iteratively derive the heading angle θyx error, the pitch angle θzy error, and the roll angle θxz error based on corresponding components of the derived angular displacements θi, θj, and θk of the angle sensor device 102, the misalignment determiner 512 uses a 3 by 3 linear transformation matrix to perform a coordinate transformation of the derived angular displacements θi, θj, and θk (e.g., matrix column vectors) in the local axes 114a, 116a, and 118a of the angle sensor device 102 to the corresponding vector axes 64, 66, and 68 of the vehicle 60 (e.g., matrix row vectors) as represented in Equation (6).

$$\begin{matrix} a00 & a01 & a02 \\ a10 & a11 & a12 \\ a20 & a21 & a22 \end{matrix} \quad \text{Equation (6)}$$

The misalignment determiner 512 uses an Identity Matrix shown in Equation (7) to represent the reference location 108 or starting position of the angle sensor device 102. The Identity Matrix is based on the 3 by 3 linear transformation matrix in Equation (6) and represents that the initial angular displacement θi of the angle sensor device 102 corresponds to a zero heading angle θyx error, the initial angular displacement θj of the angle sensor device 102 corresponds to a zero pitch angle θzy error, and the initial angular displacement θk of the angle sensor device 102 corresponds to a zero roll angle θxz error.

$$\begin{matrix} 1 & 0 & 0 \\ 0 & 1 & 0 \\ 0 & 0 & 1 \end{matrix} \qquad \text{Equation (7)}$$

For each angular displacement θi (i.e., for each heading change) derived by the misalignment determiner 512, the misalignment determiner 512 determines the sine and cosine of the derived angular displacement θi angle (referenced as SH and CH, respectively) and derives the corresponding current position of the angle sensor device 102 by updating the matrix elements in accordance with Equation (8).

$$a00*CH+a01*SH-a00*SH+a01*CH\ a02$$

$$a10*CH+a11*SH-a10*SH+a11*CH\ a12$$

$$a20*CH+a21*SH-a20*SH+a21*CH\ a22 \qquad \text{Equation (8)}$$

For each angular displacement θj (i.e., for each pitch change) derived by the misalignment determiner 512, the misalignment determiner 512 determines the sine and cosine of the derived angular displacement θj angle (referenced as SP and CP, respectively) and derives the corresponding current position of the angle sensor device 102 by updating the matrix elements in accordance with Equation (9).

$$a00*CE+a02*SE\ a01-a00*SE+a02*CE$$

$$a10*CE+a12*SE\ a11-a10*SE+a12*CE$$

$$a20*CE+a22*SE\ a21-a20*SE+a22*CE \qquad \text{Equation (9)}$$

Similarly, for each angular displacement θk (i.e., for each roll change) derived by the misalignment determiner 512, the misalignment determiner 512 determines the sine and cosine of the derived angular displacement θk angle (referenced as SR and CR, respectively) and derives the corresponding current position of the angle sensor device 102 by updating the matrix elements in accordance with Equation (10).

$$a00\ a01*CR+a02*SR-a01*SR+a02*CR$$

$$a10\ a11*CR+a12*SR-a11*SR+a12*CR$$

$$a20\ a21*CR+a22*SR-a21*SR+a22*CR \qquad \text{Equation (10)}$$

The misalignment determiner 512 is operatively configured to recalculate the current position of the angle sensor device 102 or update the matrix elements for a heading, pitch, and roll angular displacement in accordance with Equations (8), (9), and (10) until no further accelerations are sensed by the accelerometers 602, 604, 606, 608, 610, or 612 (e.g., when the angle sensor device 102 is mounted at the second location 110 where the removable device 50 is to be mounted).

Once the angle sensor device 102 is mounted at the second location 110 and no further accelerations are sensed by the accelerometers 602, 604, 606, 608, 610, or 612, the misalignment determiner 512 is operatively configured to determine the final heading θyx error, the pitch angle θzy error, and the roll angle θxz error as follows. First, the misalignment determiner 512 sets the sine of the pitch angle θzy error (referenced as SP') equal to the a20 matrix element as shown in Equation (11) and then derives the cosine of the pitch angle θzy error (referenced as CP') based on SP' as shown in Equation (12).

$$SP'=a20 \qquad \text{Equation (11)}$$

$$CP'=\text{square root}(1-SP'*SP') \qquad \text{Equation (12)}$$

The misalignment determiner 512 then determines the final pitch angle θzy error by determining the inverse cosine of the CP' value derived in Equation (12).

Next, the misalignment determiner 512 derives the sine of the roll angle θxz error (referenced as SR') based on the value of a21 and CP' as shown in Equation (13).

$$SR'=a21/CP' \qquad \text{Equation (13)}$$

The misalignment determiner 512 then determines the final roll angle θxz error by determining the inverse sine of the SR' value derived in Equation (13).

The misalignment determiner 512 also derives the sine of the heading angle θyx error (referenced as SH') based on the value of a21 and CP' as shown in Equation (14).

$$SH'=a10/CP' \qquad \text{Equation (14)}$$

The misalignment determiner 512 then determines the final heading angle θyx error by determining the inverse sine of the SH' value derived in Equation (14).

The misalignment determiner 512 then stores the final pitch angle θzy error, the final roll angle θxz error, and the heading angle θyx error for use as the misalignment errors of the removable device 50 when operated in or on the vehicle 60.

One having skill in the art will appreciate that the misalignment determiner program 512 may comprise or may be included in one or more code sections containing instructions for performing their respective operations. While the misalignment determiner program 512 is described as being implemented as software, the program may be implemented as a combination of hardware and software or hardware alone.

Although aspects of methods, systems, and articles of manufacture consistent with the present invention are depicted as being stored in memory (e.g., misalignment determiner 512), one having skill in the art will appreciate that these aspects may be stored on or read from other computer-readable media, such as secondary storage devices, like hard disks, floppy disks, and CD-ROM; a carrier wave received from a network such as the Internet; or other forms of ROM or RAM either currently known or later developed. Further, although specific components of alignment system 100 have been described, one having skill in the art will appreciate that an alignment system or other data processing system suitable for use with methods, systems, and articles of manufacture consistent with the present invention may contain additional or different components.

The foregoing description of an implementation of the invention has been presented for purposes of illustration and description. The description is not exhaustive and does not limit the invention to the precise form disclosed. Modifications and variations are possible in light of the above teachings or may be acquired from practicing the invention. For example, the described implementation includes software (e.g., misalignment determiner 512) but the present implementation may be implemented as a combination of hardware and software or hardware alone. Further, the illustrative processing steps performed by the program 512 can be executed in an order different than described above, and additional processing steps can be incorporated. The invention may be implemented with both object-oriented and non-object-oriented programming systems. The scope of the invention is defined by the claims and their equivalents.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. A method for measuring misalignment between a first mounting location on a vehicle and a second mounting location, the vehicle having a reference frame, the method comprising:
    aligning a local frame of reference at the first mounting location with the vehicle's reference frame;
    sensing net angular displacement of the local frame as it is removed from the first mounting location, moved to the second mounting location, and mounted at the second location such that the local frame is aligned with a reference frame at the second location; and
    using the net angular displacements to compute misalignment between the vehicle's reference frame and the reference frame at the second mounting location.

2. The method of claim 1,
    wherein aligning the local frame includes mounting a sensor system at the first mounting location, the sensor system providing the local frame of reference and including a plurality of accelerometers that are positioned along the local frame of reference such that the local frame of the sensor system coincides with the vehicle's reference frame; and
    wherein sensing the net angular displacement includes mounting the sensor system at the second mounting location such that the local frame of reference of the sensor system coincides with the reference frame at the second mounting location; and
    wherein a computer determines the net angular displacement of the local frame as the sensor system is moved between the first and second mounting locations, and uses the net angular displacements to compute the misalignment.

3. The method of claim 2,
    wherein the local frame provided by the sensor system has a first local axis, a second local axis orthogonal to the first local axis, a third local axis orthogonal to the first local axis and the second local axis, and wherein the plurality of accelerometers includes first pair of accelerometers along the first local axis, spaced apart a first predetermined distance, and oriented such that each accelerometer of the first pair used to sense a respective acceleration when the sensor system is rotated about the second local axis, wherein the first, second, and third local axis are aligned with a corresponding first, second, and third axis of the vehicle's reference frame when the sensor system is mounted at the first mounting location, and wherein the first, second, and third local axis are aligned with a corresponding first, second, and third axis of the reference frame at the second mounting location when the sensor system is mounted at the second mounting location.

4. The method of claim 3, wherein the sensor system includes a second pair of accelerometers along the second local axis, spaced apart a second predetermined distance, and oriented such that each accelerometer of the second pair is used to sense a respective acceleration when the sensor system is rotated about the first local axis; and wherein the computer derives a second angular displacement based on the respective acceleration sensed by each accelerometer of the second pair when the sensor system is rotated about the first local axis.

5. The method of claim 4, wherein the first pair of the accelerometers and the second pair of accelerometers share one accelerometer.

6. The method of claim 4, wherein the sensor system includes a third pair of the accelerometers along the first local axis, spaced apart a third predetermined distance, and oriented such that each accelerometer of the third pair is used to sense a respective acceleration when the sensor system is rotated about the third local axis; and wherein the computer derives a third angular displacement based on the respective acceleration sensed by each accelerometer of the third pair when the sensor system is rotated about the first local axis.

7. The method of claim 3, wherein the computer derives a first distance displacement associated with the acceleration sensed by a first accelerometer of the first pair and a second distance displacement associated with the acceleration sensed by a second accelerometer of the first pair and derives the first angular displacement based on a difference between the first and second distance displacements and the first predetermined distance.

8. The method of claim 3, wherein the sensor system is rotated about the second local axis when the sensor system is mounted at the second mounting location and the computer associates the derived angular displacement with a misalignment error of a removable device at the second mounting location.

9. The method of claim 1, wherein the misalignment indicates roll angle error, heading angle error, and pitch angle error.

10. The method of claim 1, wherein the vehicle has a removable device mountable at the second mounting location; and wherein the computed misalignment is used to boresight the removable device to the vehicle's reference frame.

11. The method of claim 10, wherein the vehicle is a helicopter and the removable device is a line replaceable unit.

* * * * *